March 9, 1926.                                            1,575,784
D. H. O'MEARA
MAGNIFIER
Filed July 16, 1924
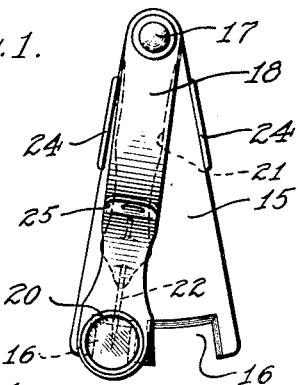
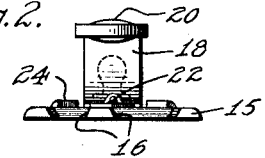
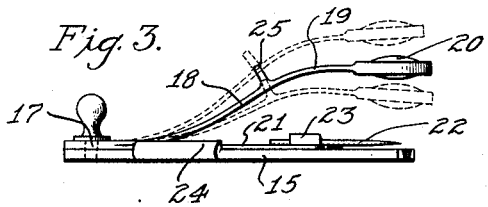
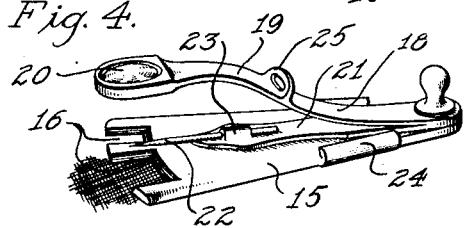
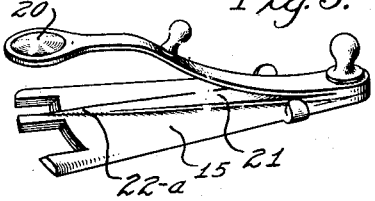
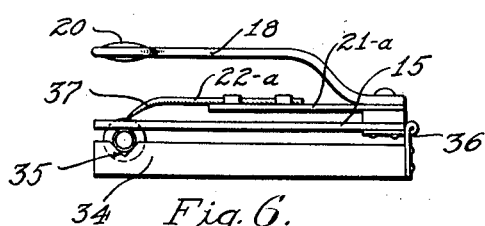
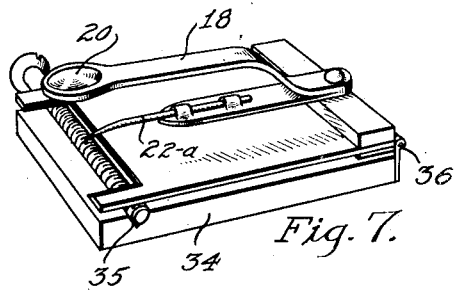
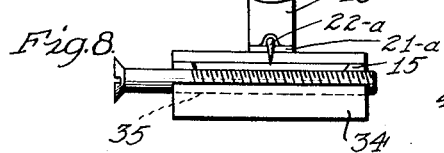
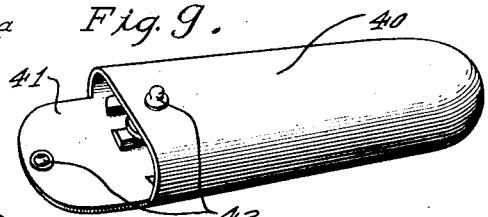
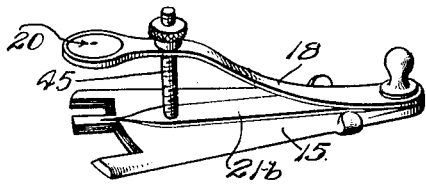
INVENTOR
Denis H. O'Meara.
BY
Harry H. Styll
ATTORNEY Patented Mar. 9, 1926.

1,575,784

UNITED STATES PATENT OFFICE.

DENIS HENRY O'MEARA, OF DETROIT, MICHIGAN, ASSIGNOR TO AMERICAN OPTICAL COMPANY, OF SOUTHBRIDGE, MASSACHUSETTS, A VOLUNTARY ASSOCIATION OF MASSACHUSETTS.

MAGNIFIER.

Application filed July 16, 1924. Serial No. 726,317.

*To all whom it may concern:*

Be it known that I, DENIS HENRY O'MEARA, a citizen of the United States, residing at Detroit, in the county of Wayne and State of Michigan, have invented certain new and useful Improvements in Magnifiers, of which the following is a specification.

This invention relates to improvements in magnifiers and has particular reference to a magnifier which is adapted for the examination of surfaces, and having indicating means for focusing the user's attention on a certain portion of said surface.

One of the principal objects of my invention is to provide an improved surface examining magnifier which will be adapted for movement over the surface being examined.

A further object is to provide such a magnifier with means for focusing the user's attention on a certain small portion of the surface.

Another object is to provide such a device wherein the said focusing means will be movable with the magnifying lens.

Still another object is to provide such a device particularly adapted for counting certain surface characteristics as will be hereinafter set forth.

A further object is to provide such a device which will be simple in construction, strong and durable in service, and an improvement in the art.

In the accompanying drawings forming a part of this specification, I have illustrated several embodiments of my invention, wherein:

Figure 1 is a top plan view of one form of magnifier;

Figure 2 is a front elevation of the same;

Figure 3 is a side elevation thereof;

Figure 4 is a perspective view of the same form;

Figure 5 is a view similar to Figure 4, showing a modified and simplified construction;

Figure 6 is a side elevation of another modification which is especially adapted for use in counting the number of threads in a fine helix, such as in very small, fine screws;

Figure 7 is a perspective view thereof;

Figure 8 is a front elevation of the same structure;

Figure 9 illustrates the instrument as contained in a case, convenient for carrying in the user's pocket.

Figure 10 illustrates another modification wherein the focusing of the lens is actually accomplished through the medium of a screw thread.

Similar reference characters designate corresponding parts throughout the several views.

Referring first to Figures 1, 2, 3 and 4, I provide a base member or plate 15, which is here shown as being of a sector like shape, but which obviously may be of any other desirable configuration, said plate being provided at one edge with the notches 16, which may be of any number or size. At the edge of the plate opposed from the notches 16, is a pivot 17 upon which is movably mounted a supporting member 18, which in the first embodiment under consideration is preferably of a suitable resilient material and curved as at 19 so that its outer end, that is, the end away from the pivot 17, is spaced a substantial distance above the plate or base 15. The outer end of the arm or support 18 carries a lens 20, which is here shown as being a magnifying lens, but which, of course, could have any other desirable optical properties, the proportions of the parts being such that the lens is disposed in substantial alinement above the notches 16. Secured to the support 18 is an underlying arm 21, which is disposed between the support and the base 15, said arm carrying at its extremity and in central alinement with the pivot 17, an indicating member 22, which is here shown as being in the form of a pin which may be mounted in any manner in the boss 23. This pin is suitably sharpened at its extremity and disposed in axial alinement with the lens 20 for a purpose to be hereinafter set forth.

If desirable the base plate 15 may be provided at each side with bent up ears 24 to act as stops for the arm 21 in the support 18, whereby the movement of the lens in relation to the base will be limited. Also, if desirable, the support 18 may be provided with a finger grip 25, as clearly shown in Figure 4.

In the use of this device the whole instrument, including the base 15, is properly positioned upon some surface which is to be examined, and the support 18 being properly flexed to focus the lens 20 accurately on said surface. The support 18 may then be moved about the pivot 17, the user at the same time focusing his attention upon the pointer 22, whereby he will be readily able to differentiate between certain adjacent surface characteristics.

One very important use for this magnifying instrument is in connection with the testing of linen. For example, buyers of linen or other woven textile materials, must know what the quality of the material is, and one of the determining points in connection with the quality resides in the number of threads per lineal unit of measurement, for example, the number of threads per inch. Heretofore people conducting such examinations have merely used a plain magnifying lens and tried to follow intermittently from one thread to another with their eyes, but quite frequently they would either skip a thread or count a thread twice, so that they could not be absolutely certain of having obtained the proper count.

With my invention the apparatus is placed upon the textile or other material, the lens properly focused, and the whole thing swung about the pivot 17 gradually, and the threads counted as the indicating member 21 crosses each individual thread. In this way there is no possibility for one thread being skipped or of threads being counted more than once.

Obviously, the device is susceptible of use for purposes other than the examination of textile fabrics; for example, it may be used for counting very fine screw threads on some screws, such as used in watches and other delicate instruments, or it may be used for inspection purposes in manufacturing plants, such as in the counting of the number of turns of wire on a fine electrical coil, etc.

In Figure 5, I have shown a modified form of the invention wherein the indicating member 22ª is formed by the sharpened extension of the arm 21, thus eliminating the boss 23 and the separate pin 22 as used in the preceding form.

Referring now particularly to Figures 6, 7 and 8, I have shown another modified form of the invention, which is particularly adaptable for counting very fine screw threads or similar inspection work. Here a main base 34 is provided with a V-shaped groove 35, in which the screw or other member to be examined, is placed. The plate 15 which carries the lens support and pointer is hinged as at 36 to one end of the base 34 away from the groove 35. With this construction the lens and pointer are properly positioned in relation to the surface being examined regardless of the diameter of the screw, as will be obvious from the drawings. Also, in this construction it will be noticed that I have positioned the arm 21ª in spaced relation from the plate 15, and to compensate therefor I have provided the end 37 of the pointer 22ª with an offset as best shown in Figure 6.

In the commercial exploitation of my invention it would be most desirable to provide a case 40 (see Figure 9) in which the instrument may be placed when not in use, said case having a cover member 41 and suitable locking means 42, so that the person who has use for such an instrument may very conveniently carry it in his pocket without any danger of breakage or other injury.

It may be desirable to have a mechanical focusing means for the lens 20 and if so, this may be accomplished somewhat as shown in Figure 10. In this view the reference character 21ᵇ designates the pointer member which is pivoted and movable with the lens carrying arm 18 as heretofore described. Adjacent to the pointer, the extending lens 21ᵇ is mounted by riveting, raising, or soldering a screw threaded member 45 which extends through a slot in the member 18 and is engaged at its outer end with a nut or finger piece 46. When this construction is used, the whole device is placed upon the surface being examined as previously explained and the nut 46 is adjusted to actually focus the lens 20, whereupon the members 18 and 21ᵇ together with their associated parts may be simultaneously moved.

From the foregoing description it will be evident that I have provided a novel instrument particularly adapted for special examinations, as clearly set forth, and that my device will be simple in construction and strong and durable in service. Of course, other modifications may be resorted to and I do not wish to limit myself to the precise details of construction herein illustrated and described, since I reserve the right to make changes falling within the scope of the appended claims without departing from the spirit of the invention.

Having thus described my invention, I claim:

1. In a device of the character described, a base plate having a plurality of recesses at one end, an arm having a pointer pivoted at the other end of the base plate, said pointer being adapted to travel over the recesses in the end of the base plate about its pivot, a second arm pivoted on the same pivot with the first arm and having a lens aligned with the pointer.

2. In a device of the character described, a base plate having an arcuate end, an arm having a pointer, a second arm having a lens aligned with the pointer secured to the first arm, and pivotal means connecting the arms to the base plate whereby the pointer and lens will travel over the arcuate end of the base plate about the pivot of the arms as a center.

3. In a device of the character described, a base plate, stops on the base plate, an arm having a pointer, an arm having a lens aligned with the pointer and pivotal means connecting the two arms on the same pivot to the base plate, whereby the pointer will travel over the end of the base plate about the pivot and the stops will engage a pivoted arm to regulate the travel of the arms about the pivot.

4. In a device of the character described, a base plate, an arm having a pointer pivoted on the base plate, an arm having a lens pivoted on the base plate whereby the lens and the pointer may be pivotally moved over the end of the base plate.

5. In a device of the character described, a base plate, an arm having a pointer pivoted on the base plate, an arm having a lens pivoted on the base plate, said arm and said lens being pivotally movable over the end of the base plate, and means for fixing the distance of the lens of the base plate to focus the lens.

6. In a device of the character described, a base plate, a member hinged to the base plate, an arm having a pointer pivoted on the hinge member, and an arm having a lens pivoted on the hinge member, said pointer and said lens being pivotally movable over the end of the base plate.

DENIS HENRY O'MEARA.